United States Patent [19]

Belter

[11] Patent Number: 5,044,641
[45] Date of Patent: Sep. 3, 1991

[54] FRICTIONLESS POSITIONING GROMMET FOR ENGINE GASKET

[75] Inventor: Jerome G. Belter, Mt. Prospect, Ill.

[73] Assignee: Dana Corporation, Toledo, Ohio

[21] Appl. No.: 429,519

[22] Filed: Oct. 31, 1989

[51] Int. Cl.[5] .............................................. F16J 15/12
[52] U.S. Cl. ..................................... 277/11; 277/181; 277/189; 277/235 B
[58] Field of Search ................. 277/11, 166, 179, 181, 277/189, 235 B

[56] References Cited

U.S. PATENT DOCUMENTS

| | | |
|---|---|---|
| Re. 24,065 | 10/1955 | Bergstrom . |
| 949,658 | 2/1910 | Randall . |
| 1,524,682 | 2/1925 | Bailey . |
| 1,627,167 | 5/1927 | Fitzgerald ........................ 277/235 B |
| 1,928,585 | 9/1933 | Balfe ................................ 277/235 B |
| 1,942,704 | 1/1934 | Hubbard et al. . |
| 2,462,762 | 2/1949 | Nardin . |
| 2,745,521 | 5/1956 | White . |
| 2,981,247 | 4/1961 | Gaebler . |
| 3,186,042 | 6/1965 | Daley . |
| 4,002,344 | 1/1977 | Smith ..................................... 277/11 |
| 4,026,565 | 5/1977 | Jelinek ........................ 277/235 B X |
| 4,101,138 | 7/1978 | Gaggiano . |
| 4,405,138 | 9/1983 | Skrycki . |
| 4,513,978 | 4/1985 | Nicholson . |
| 4,524,979 | 6/1985 | Bauder . |
| 4,730,836 | 3/1988 | Miller et al. . |
| 4,732,519 | 3/1988 | Wagner . |
| 4,776,601 | 10/1988 | Yamada . |
| 4,784,396 | 11/1988 | Scott et al. . |
| 4,819,954 | 4/1989 | Fucci et al. . |

FOREIGN PATENT DOCUMENTS 3610541 10/1987 Fed. Rep. of Germany ... 277/235 B

OTHER PUBLICATIONS

"The Gasket": p. 4, publ. by Goetz Gasket Co., in 1944.

Primary Examiner—William A. Cuchlinski, Jr.
Assistant Examiner—Scott W. Cummings
Attorney, Agent, or Firm—F. B. McDonald

[57] ABSTRACT

A plurality of positioning grommets are fixed to a gasket for use in an internal combustion engine. The gasket is adapted to provide sealing between two separate but communicating engine parts which contain mating bores for passage of mechanical fasteners. One of the parts includes at least two counterbores, each concentrically aligned with one mechanical fastener bore. Each counterbore is adapted to receive a grommet sized and toleranced to assure clearance from the sidewall and bottom of the counterbore, and hence to provide an interference-free grommet-counterbore mating. In a preferred form, each grommet body contains a plurality of circumferentially spaced integral detents.

7 Claims, 1 Drawing Sheet

FRICTIONLESS POSITIONING GROMMET FOR ENGINE GASKET

BACKGROUND OF THE INVENTION

This invention relates to the positioning of engine gaskets between communicating engine parts adapted to be mechanically fastened together, particularly during assembly line processes. More particularly, the invention relates to the design of positioning devices, variously called grommets, bushings, eyelets, and ferrules, utilized to assist in accurate placement of a gasket on one of the parts to be joined.

Numerous devices have been provided for positioning gaskets on engine parts during assembly. A number of devices have included plastic members, some of which are shaped like inverted Christmas trees having tapered bodies for positive placement. Most of such devices are separate from the gasket and are typically inserted after the gasket has been laid over the surface of the engine part. Some of the devices are made of metal, and in at least one case, the positioning device is permanently fixed to the gasket at the time of manufacture. All of the foregoing devices, however, have in common the aspect of being designed to frictionally engage a bore within the engine part to which the gasket is to be applied. Due to tolerance variations in gasket sizing and bore location, there is a certain amount of gasket distortion not readily accommodated by these positioning devices. Ideally, positioning devices would be designed to yield or shift in associated engine bores to permit gaskets to lay flat and to hence minimize distortion. Upon securement of mating parts, a distorted gasket is more susceptible to leakage, and thus likely to result in engine failure.

SUMMARY OF THE INVENTION

The frictionless positioning grommet system of the present invention provides a solution to the tolerance-distortion problem inherent in the use of prior art gasket positioning devices. At least two grommets are securely fixed to the gasket at positions coincident with bolt hole apertures of the gasket. At least one of the engine parts to be mated is provided with counterbores adapted to receive the grommets, the counterbores being concentrically aligned with bolt holes. The grommets are sized to maintain a frictionless interference-free clearance with the side walls and bottoms of the associated counterbores, and are preferably positioned at bolt hole apertures farthest apart on the gasket. The grommets are thus adapted to accommodate potential misalignment due to tolerances variations in either the manufactured gasket or engine bolt locations, or both.

Defining a generally cylindrical body, each grommet contains a plurality of circumferentially spaced integral detents. The detents and associated counterbores are toleranced to provide clearances even at the minimum counterbore diameter and the maximum detent radius. In a preferred form, the maximum radial clearance between grommet and counterbore is on the order of twenty thousandths of an inch.

Finally, each grommet is secured to the gasket by means of two sets of axially spaced flanges, each set being circumferentially off-set from the other, each flange within each set being radially aligned with the others in its set. The axially spaced sets are compressed toward each other to secure each grommet to the gasket.

DETAILED DESCRIPTION OF A PREFERRED EMBODIMENT

Figure 1:
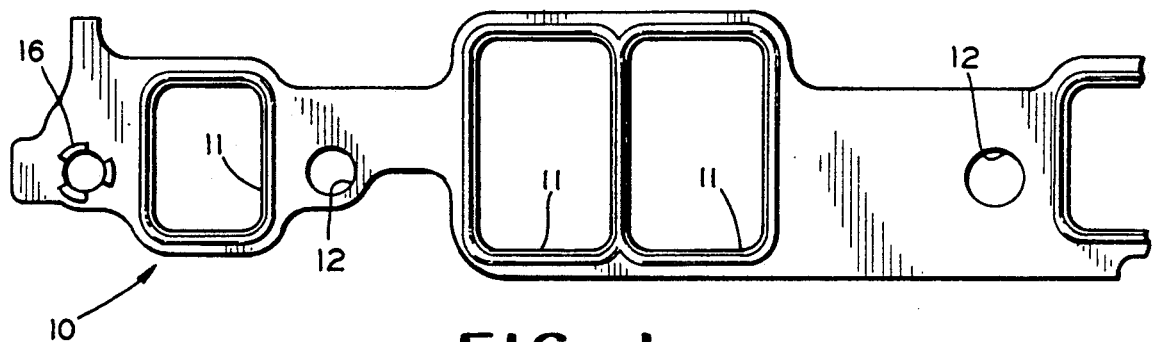
FIG. 1 is a fragmentary plan view of an engine gasket which incorporates a preferred embodiment of the frictionless positioning grommet of the present invention.
Figure 3:
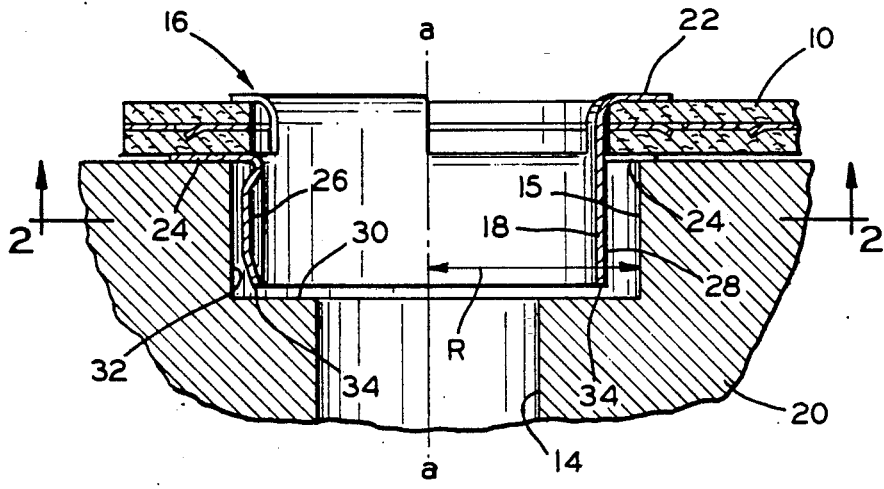
FIG. 3 is a cross-sectional view of the presently preferred embodiment of the invention wherein the frictionless positioning grommet is shown installed in a counterbore of an engine part.

Referring to the drawing figures, an engine gasket 10 contains a plurality of apertures 11 providing various air and/or coolant openings for registration with appropriate bores through engine parts 20, only one part 20 being shown fragmentarily in FIG. 3. The gasket 10 incorporates a plurality of bolt apertures 12, two of which each contain a positioning grommet 16, only one of which is shown in the fragmented view (FIG. 1) of the gasket 10.

Those skilled in the art will appreciate that the bolt apertures 12 are located for mating registration with fastener bores 14 (FIG. 3) in the engine part 20. In the presently preferred embodiment, the bores 14 are threaded to receive a bolt (not shown). Concentrically aligned with each bore 14 is a counterbore 15 adapted to receive the cylindrical body portion 18 of a grommet 16.

Figure 2:
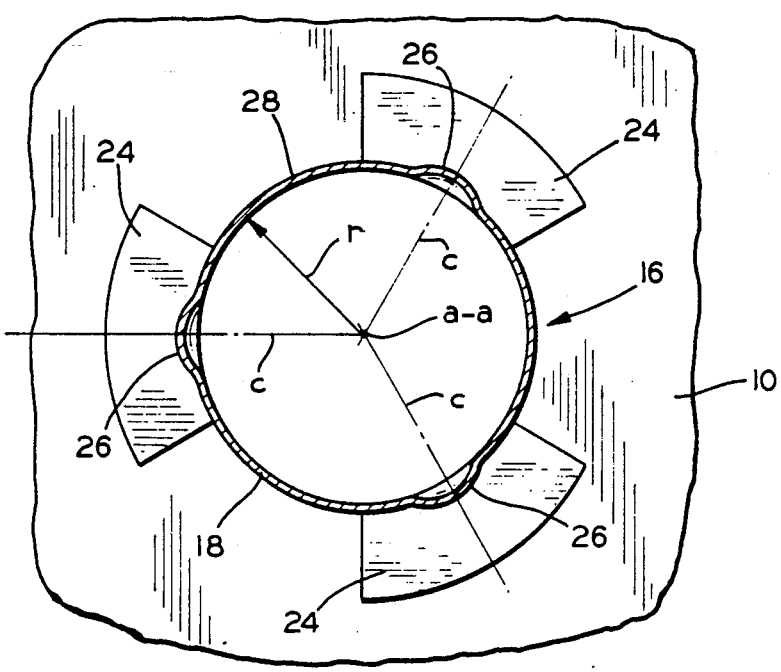
FIG. 2 is a fragmentary plan view of the lower flanges and the cylindrical body of the grommet of the gasket of FIG. 1, as viewed along lines 2—2 of FIG. 3.

Each grommet 16 (FIGS. 2 and 3) contains integral upper and lower radially extending protrusions or flanges 22,24 positioned radially about the cylindrical axis a—a of the grommet 16. The lower flanges 24 are axially spaced from upper flanges 22, the latter (upper) flanges defining the upper extremity of the grommet 16. It will be appreciated that respective sets, three upper and three lower, of flanges 22,24 are both axially and circumferentially off-set from one another. While FIG. 2 depicts only the lower set of flanges 24, those skilled in the art will appreciate that this preferred embodiment provides sets of three symmetrically positioned upper and lower flanges. Other embodiments may provide more or less. Respective flanges of each set are off-set by 60 degrees in the present embodiment, each flange of one set being positioned exactly radially intermediate two flanges of the other set. As will also be appreciated by those skilled in the art, the two sets of flanges 22,24 are compressed axially toward each other for securement of each grommet to a bolt aperture 12 of the gasket 10.

Referring now particularly to FIG. 3, it will be noted that the exterior 28 of the cylindrically body 18 of each grommet 16 is positioned with a tolerance controlled clearance from the interior sidewall 32 of the counterbore 15. Similarly, each mating grommet and counterbore are sized so that the axially extending extremity 34 of the grommet 16 is spaced to avoid contact with the bottom 30 of the counterbore 15. This invention provides a system of tolerances which assures that there always exist some clearance, even under the statistically rare condition of the counterbore 15 being at its minimal radius "R" while the radius "r" of the grommet exterior 28 is at its maximum.

EXAMPLE

In one preferred set of size ranges of the frictionless positioning grommet system of the present invention, the counterbore has a radius tolerance range "R" of 0.2335 to 0.2410 inches. The exterior 28 of the mating grommet 16 is sized to a radius tolerance range "r" of 0.2300 to 0.2325 inches. The diameter of the threaded mechanical fastener bore 14 accommodates a ⅜" bolt, or one having a size of 0.375 inch. Those skilled in the art will appreciate that the resultant grommet-to-bore total diametric sidewall clearance range will be 0.002–0.022 inch, as measured between the exterior 28 of the cylindrical body 18 and the interior sidewall 32 of the counterbore 15. The latter dimensions guarantee sidewall clearance, to the extent that the smallest permissible total clearance value is 0.002 inch.

Referring again to both FIGS. 2 and 3, the presently preferred embodiment calls for a plurality of circumferentially distributed integral detents 26 about the axis a—a of the cylindrical body 18. In the preferred embodiment, the detents are symmetrically positioned on radial centerlines "c" which pass through the lower flanges 24. The detents are formed preferably at the axial midpoint or center of the cylindrical body 18, and preferably by a progressive die for assuring uniformity. Use of detents allows an ever greater clearance between the counterbore 15 and the major circumferential portion of the cylindrical body 28 which does not possess detents. In the example above, each detent protrudes 0.015 inch radially from the body 28. Thus, the non-detented portion of the body 18 is provided with an additional 0.030 inch total diametric clearance from the interior surface 32 of the counterbore 15.

The clearances between the lower extremity 34 of the grommet 16 and the bottom 30 of the counterbore are not as critical, but should be appropriately sized to always remain out of contact with the bottom 30 of the counterbore. The latter aspect, however, relates to proper axial mating of the gasket upon final securement of the engine parts, rather than to the radial positioning of the gasket between parts.

Finally, the grommets 16 can be made of any formable metal, such as, for example, tin-plated steel. Aluminum, copper, and brass may also be conveniently utilized. Plastic is not feasible, to the extent that the appropriate material must be yieldable for forming purposes.

Those skilled in the art will appreciate that the provision of radial clearances between the grommets 16 and associated counterbores 15 will operate to minimize gasket distortion resulting from misalignments between gasket apertures and fastener bores of mating engine parts. To the extent that adequate bore clearances are provided for each of the positioning grommets, a system is provided wherein the resultant potential distortions are alleviated by ability of the grommet bodies 18 to shift radially away from their theoretically concentric axes a—a within the bores.

Although only one preferred embodiment has been detailed and described herein, the following claims are envisioned to cover numerous additional embodiments not particularly described.

What is claimed is:

1. In a gasket having a plurality of apertures, at least two of which are adapted to accommodate passage of mechanical fasteners, said gasket being disposed for securement between two separate but communicating parts of an engine, said parts containing mating bores for accommodating passage of said mechanical fasteners; an improvement comprising one of said engine parts having a counterbore disposed concentrically in each of two of said engine fastener bores, each counterbore defining an axis, and a plurality of grommets fixed to said gasket for locating said gasket relative to said one engine part, one grommet disposed within each one of said counterbores, each counterbore and associated grommet sized for frictionless, interference-free radial clearance, wherein each grommet defines a generally cylindrical body having an axis coincident with said axis of its associated counterbore, a first end of said cylindrical body comprising a first plurality of radially extending, symmetrically spaced flanges circumferentially distributed about said axis, an intermediate portion of said cylindrical body comprising a second plurality of radially extending, symmetrically spaced flanges, also circumferentially distributed about said axis, said first and second pluralities of flanges being axially spaced apart and with individual flanges of said first and second respective pluralities being circumferentially offset from one another, wherein said axially spaced first and second pluralities are compressed axially toward each other to secure each said grommet to said gasket, and wherein said cylindrical body of each grommet comprises a plurality of integral detents, each detect symmetrically and radially aligned with one flange of said second plurality.

2. The gasket of claim 1 wherein said plurality of grommets comprises two grommets, and wherein said grommets are comprised of a formable metal.

3. The gasket of claim 2 wherein said frictionless, interference-free clearance between each said grommet and mating counterbore comprises a range of 2–22 thousandths of an inch in total diametric clearance.

4. The gasket of claim 3 wherein said cylindrical body comprises a second end having an extremity axially spaced from contact with said mating counterbore.

5. The gasket of claim 4 wherein each grommet comprises a plurality of integral detents circumferentially distributed about the axial center of said cylindrical body of said grommet, wherein each of said detents extends radially outwardly of said generally cylindrically body.

6. The gasket of claim 5 wherein said cylindrical grommet body, exclusive of said integral detents, is diametrically spaced from said counterbore by 32–52 thousandths of an inch.

7. The gasket of claim 6 wherein each of said grommets is formed of tin-plated steel.

* * * * *